United States Patent [19]

Dyroff et al.

[11] 4,226,959
[45] Oct. 7, 1980

[54] PROCESS FOR THE PREPARATION OF POLYMERIC ACETAL CARBOXYLATES

[75] Inventors: David R. Dyroff, Creve Coeur; Victor D. Papanu, Maryland Heights, both of Mo.

[73] Assignee: Monsanto Company, St. Louis, Mo.

[21] Appl. No.: 86,894

[22] Filed: Oct. 22, 1979

[51] Int. Cl.³ .................... C08F 283/06; C08G 6/00; C08L 61/02
[52] U.S. Cl. ................................. 525/401; 525/398; 528/232; 528/491
[58] Field of Search ................ 525/398, 401; 528/232, 528/491

[56] References Cited

U.S. PATENT DOCUMENTS

| | | | |
|---|---|---|---|
| 4,140,676 | 2/1979 | Crutchfield et al. | 525/398 |
| 4,144,226 | 3/1979 | Crutchfield et al. | 525/401 |
| 4,146,495 | 3/1979 | Crutchfield et al. | 252/89 R |

Primary Examiner—Lucille M. Phynes
Attorney, Agent, or Firm—S. M. Tarter; W. H. Duffey; F. D. Shearin

[57] ABSTRACT

The alkali metal, ammonium and alkanol ammonium salts of polymeric acetal carboxylates are stable detergent builders under laundry use conditions but depolymerize in acid media, making the polymer fragments more readily biodegradable in waste streams. Such polymeric acetal carboxylates can now be made by the process of the present invention which comprises:

bringing together an ester of glyoxylic acid and a polymerization initiator under polymerization conditions;

adding to the resulting polymer a sufficient amount of trichloroacetic acid or trifluoroacetic acid, preferably trifluoroacetic acid, to provide temporary stability to the polymer during subsequent operations;

optionally contacting the temporarily stabilized polymer with an immiscible solvent to obtain a polymer of greater purity;

providing to the polymer in the presence of a miscible solvent, preferably acetonitrile, a sufficient amount of trichloroacetic acid or trifluoroacetic acid, preferably trifluoroacetic acid, to act as an endcapping catalyst; and adding an alkyl vinyl ether having up to about 20 carbon atoms in the alkyl group, preferably ethyl vinyl ether, to provide a chemically stable end group at the polymer termini to stabilize the polymer against rapid depolymerization in alkaline solution.

18 Claims, No Drawings

PROCESS FOR THE PREPARATION OF POLYMERIC ACETAL CARBOXYLATES

BACKGROUND OF THE INVENTION

This invention relates to an improved method of preparing polymeric acetal carboxylates, which are useful as complexing agents and detergency builders.

The property possessed by some materials of improving detergency levels of soaps and synthetic detergents and the use of such materials in detergent compositions is known. Such cleaning boosters are called "builders" and such builders permit the attainment of better cleaning performance than is possible when so-called unbuilt compositions are used. The behavior and mechanisms by which builders perform their function are only partially understood. It is known that good builders must be able to sequester most of the calcium and/or magnesium ions in the wash water since these ions are detrimental to the detergency process. However, it is difficult to predict which class of compounds possess useful combinations of builder properties and which compounds do not because of the complex nature of detergency and the countless factors which contribute both to overall performance results and the requirements of environmental acceptability.

Sodium tripolyphosphate (STPP) has been found to be a highly efficient cleaning and detergency builder and this compound has been widely used for decades in cleaning formulations. Indeed, millions of pounds of STPP are used for each year in cleaning formulations because of its superior builder qualities. However, because of the recent emphasis on removing phosphates from detergent and cleaning compositions for environmental reasons, the detergent and cleaning industry is now looking for materials suitable for use as builders which do not contain phosphorus and which are environmentally acceptable.

Polymeric acetal carboxylates have been found to be suitable as a replacement for STPP in detergent compositions. The composition of such polymeric acetal carboxylates has been disclosed in U.S. Pat. No. 4,144,226 issued Mar. 13, 1979 and in Ser. No. 962,512 filed Nov. 20, 1978. The use of such polymeric acetal carboxylates in detergent compositions is disclosed in U.S. Pat. No. 4,146,495 issued Mar. 27, 1979. A preferred method for the saponification of the esters of the polymeric acetal carboxylates to form the corresponding alkali metal salts is disclosed in U.S. Pat. No. 4,140,676 issued Feb. 20, 1979. The polymeric acetal carboxylate salts described in the above applications and patents were tested for sequestration function using the procedures described by Matzner et al in "Organic Builder Salts as Replacements for Sodium Tripolyphosphate", TENSIDE, 10, No. 3, pages 119-125 (1973). As a result of such tests, the polymeric acetal carboxylate salts were found to be superior detergent builders compared to STPP, and were stable under laundry use conditions but depolymerized at lower pH making the polymers more readily biodegradable.

Although the methods for preparing the polymeric acetal carboxylates disclosed in the above patents and patent applications are satisfactory, there is a need for improved processes to prepare such materials to achieve greater efficiencies. Now, according to the present invention, an improved process for preparing the polymeric acetal carboxylates has been developed. According to the present process, the amount of alkyl vinyl ether to provide the end group to stabilize the polymer against rapid depolymerization in alkaline solution is reduced up to four times over the amount used in the prior art processes, resulting in substantial efficiencies and cost savings.

SUMMARY OF THE INVENTION

These and other advantages are achieved by a process which comprises:

A. bringing together an ester of glyoxylic acid and a polymerization initiator under polymerization conditions;

B. adding to the resulting polymer a sufficient amount of trichloroacetic acid or trifluoroacetic acid to provide a temporarily stabilized polymer;

C. providing a miscible solvent and a sufficient amount of trichloroacetic acid or trifluoroacetic acid to act as an endcapping catalyst for the temporarily stabilized polymer; and D. adding an alkyl vinyl ether having up to about 20 carbon atoms in the alkyl group to provide a chemically stable end group at the polymer termini to stabilize the polymer against rapid depolymerization in alkaline solution.

For the purposes of this invention, the term "rapid depolymerization in alkaline solution" as it is used in the specification and claims, shall mean that in an aqueous solution of 0.5 molar sodium hydroxide containing 10 grams per liter of the polymer of the present invention, the average chain length of the polymer will be reduced by more than 50 percent, as determined by Proton Magnetic Resonance, after 1 hour at 20° C.

Broadly described, the polymeric acetal carboxylates can be prepared by the present process by bringing together in a reaction zone under polymerization conditions an ester of glyoxylic acid and a polymerization initiator, and optionally one or more comonomers, to form a polymer believed to have the following empirical formula:

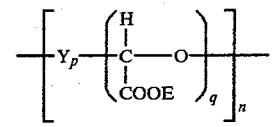

wherein Y is one or more comonomers randomly distributed along the polymer chain selected from the group consisting of alkylene oxides and aldehydes having up to 20 carbon atoms; n averages at least 4; p is 0 to an average of about 5; q is at least 1; and E is an alkyl group having 1 to about 4 carbon atoms. Thereafter, there is added an alkyl vinyl ether to the resulting polymer in the presence of an endcapping catalyst and a suitable solvent to provide a chemically stable end group derived from the alkyl vinyl ether, which stabilizes the polymer against rapid depolymerization in alkaline solution. Then, the polymeric ester is saponified to the corresponding polymeric alkali metal salt by contacting the polymeric ester with an alkali metal hydroxide.

Any number of esters of glyoxylic acid can be used as one starting material to prepare the polymeric acetal carboxylates. The hemiacetal form of the esters can be made by the reaction of an alcohol containing from 1 to 4 carbon atoms with an acid hemiacetal or acid hydrate under conditions known to those skilled in the art. Suitable esters include those having from 1 to about 4 carbon atoms in the alkoxy group, such as methyl, ethyl, propyl, isopropyl, butyl, isobutyl and the like. Other esters of glyoxylic acid can also be used, provided that the particular ester does not interfere with the polymerization, cause the polymer of the present invention to undergo rapid depolymerization in alkaline solution, or interfere with the intended function of the polymer as a chelant, sequestrant or detergent builder, and such esters of glyoxylate are equivalent for purposes of this invention. Methyl and ethyl esters are preferred. Thereafter, the resulting ester hemiacetal can be converted to the corresponding aldehyde ester by any number of techniques known to those skilled in the art, such as the reaction of the ester hemiacetal with phosphorus pentoxide according to the following general equation:

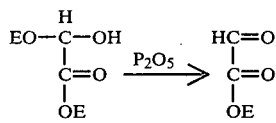

where E is an alkyl group having 1 to 4 carbon atoms.

Any number of comonomers known to those skilled in the art optionally can be copolymerized with the aldehyde ester to form a polymer product of the present invention. It is only necessary that the comonomer does not inhibit polymerization or cause the polymer product to undergo rapid depolymerization in alkaline solution. Suitable comonomers include: alkylene oxides, such as ethylene oxide, propylene oxide, epihalohydrin, epoxysuccinate and the like; aldehydes such as formaldehyde, acetaldehyde, as well as aldehydes containing up to 20 carbon atoms, and the like. Comonomers having from 1 to 4 carbon atoms, such as ethylene oxide, formaldehyde or acetaldehyde are preferred.

Mixtures of comonomers can be polymerized with the aldehyde ester to form a terpolymer, or even a more complex polymeric structure. For example, mixtures of the same class of comonomers, such as a mixture of epoxy compounds like ethylene oxide and propylene oxide, can be copolymerized with the aldehyde ester to form a terpolymer. Numerous other examples will occur to those skilled in the art in view of the present disclosure, such as a mixture of ethylene oxide and formaldehyde.

The number of carboxylate groups in the polymer product of the present invention is important since the number of carboxylate groups affects the usefulness of the corresponding polymer salt as a chelant, sequestrant and detergent builder. Hence, the nature of the comonomer or comonomers (i.e., the nature of Y), the mole ratio of comonomer to aldehyde ester (i.e., the ratio of p and q) and the number of repeating units in the polymer of the present invention (i.e., the average value of n) are each interrelated and important since they affect the number of carboxylate groups in the polymer.

Although there is theoretically no upper limit to the mole ratio of acetal carboxylate segments to comonomer segments in the polymer, when the mole ratio of acetal carboxylate segments to comonomer is less than about 1:5 (i.e., q is 1 and p averages about 5), the polymer salt loses much of its effectiveness as a chelant, sequestrant and detergent builder. It is preferred that the mole ratio of acetal carboxylate to comonomer is at least about 1:1 (i.e., p and q are each about 1) or higher, say 5:1 (i.e., p is 1 and q is at least about 5, say 50). Of course, the polymer salt is most effective as a chelant, sequestrant and detergent builder when a comonomer is not present, i.e., when p equals 0. On the other hand, the comonomers can frequently provide special properties to the polymer, e.g., improved biodegradability. Thus, when a comonomer is desirable, a relatively small comonomer that does not disperse the acetal carboxylate groups too widely or inhibit chelation by steric hindrance, such as ethylene oxide of formaldehyde, is preferred.

The number of repeating units, i.e., the average value of n, in the polymer is also important, since the effectiveness of the polymer salt as a chelant, sequestrant and detergency builder is affected by the average chain length. Even when the polymer averages only four repeating units (i.e., n averages 4), the polymer shows some effectiveness as a sequestrant, chelating agent and builder. Although there is no theoretical limit to the number of repeating units, which can average as high as 400, or even higher, there does not seen to be an advantage to having a polymer with an average of more than about 200 repeating units. When the average number of repeating units exceeds about 100, significant improvement in sequestration, chelation and builder properties is not observed. Thus, it is preferred that the polymer product contain an average between about 10 and about 200 units, and even more preferred that the polymer product contains an average between about 50 and about 100 repeating units in the chain.

Any number of initiators can be used to polymerize the aldehyde ester. Suitable initiators include 2-hydroxy pyridine-$H_2O$ complex, triethyl amine, boron trifluoride etherate, 3A molecular sieves, and the like. Even traces of hydroxy ion or cyanide ion will trigger the polymerization. Compounds such as dialkyl sodiomalonate or sodiomethylmalonate esters have been used with good results, and are preferred for use in the process of the present invention.

The polymerization conditions can vary within wide limits. The temperature at the beginning of polymerization can vary between about $-70°$ C. to about $50°$ C., although satisfactory results are obtained between $-20°$ C. and about $20°$ C. The temperature rise after the polymerization is initiated is not critical, although it is preferred to prevent a temperature rise of more than about $50°$ C. Satisfactory results are obtained at atmospheric pressure although higher or lower pressures could be used.

Any number of miscible solvents can be included in the reaction zone during polymerization to aid agitation. Suitable solvents include alkyl nitriles having 1 to 4 carbon atoms or more in the alkyl group, such as acetonitrile. Other suitable solvents include dimethyl sulfoxide, acetone, methylene chloride, tetrahydrofuran, ethyl acetate and the like. It is only necessary that the solvent does not interfere with the polymerization, and can be separated from the resulting polymer with relative ease. Solvents having a dielectric constant of at least 15, such as the alkyl nitriles like acetonitrile, are preferred since they are used in subsequent steps in the preferred process of the present invention, and as will occur to those skilled in the art, it is preferred to minimize the number of solvents used in the process.

According to the process of the present invention, after the aldehyde ester has been polymerized with or without a comonomer as discussed above, it was surprisingly found that the resulting polymer could be provided with temporary stability by adding trichloroacetic acid or trifluoroacetic acid to the resulting polymer. This provides sufficient stability to the polymer to permit the polymer to be subjected to subsequent purification by solvent extraction, but the polymer is not sufficiently stable to be stable against rapid depolymerization in alkaline solution. Trifluoroacetic acid is preferred.

The amount of trichloroacetic acid or trifluoroacetic acid can vary within wide limits as will occur to those skilled in the art in view of the present disclosure. For greatest efficiency, there should be at least one mole of trichloroacetic acid or trifluoroacetic acid per mole of the polymer termini to provide the temporary stability, and it is preferred to use about a 20 percent molar excess over the minimum required to provide the temporary stability. For example, if a homopolymer of polymeric acetal carboxylates is prepared having a chain length which averages about 50 repeating units, then at least about 0.04 mole of trichloroacetic acid or trifluoroacetic acid would be required for each mole of acetal carboxylate monomer charged to the polymerization zone. To provide a 20 percent molar excess, about 0.05 mole of trifluoroacetic acid or trichloroacetic acid would be required. Greater quantities of the trichloroacetic acid or trifluoroacetic acid could be used but increased temporary stability is not achieved and since the excess is lost during subsequent purification, no particular benefit is seen in using larger quantities. On the other hand, the use of lesser amounts of trichloroacetic acid or trifluoroacetic acid can result in lower yields of the polymer product.

The temperature of the polymer at the time it is temporarily stabilized by the addition of trichloroacetic acid or trifluoroacetic acid, according to the improved process of the present invention, can vary within wide limits depending on the desired average chain length and molecular weight distribution. The unstabilized polymer is in equilibrium with the monomer, and lower temperatures favor the formation of the polymer. Consequently, adding the trichloroacetic acid or trifluoroacetic acid at lower temperatures provides a polymer with a higher average chain length. In addition, temperature control will influence molecular weight distribution since wide fluctuations in temperature during the time the haloacetic acid is added will produce greater variations in the molecular weight distribution. To produce a polymer suitable for detergent applications, it is preferred to maintain the temperature range at the beginning of the addition of the haloacetic acid from about $-10°$ C. to about $10°$ C., and to limit the temperature rise during the addition to about $20°$ C. or less.

After the polymer has been temporarily stabilized, temperature is not as critical since the formation of lower molecular weight polymer chains is retarded. Thus, the temporary stabilization allows somewhat higher temperatures to be used for the polymer stabilization with alkyl vinyl ethers, resulting in improved reaction rates. However, it is preferred to maintain the polymer at temperatures below about $25°$ C. until the polymer has been stabilized against rapid depolymerization in alkaline solution.

In the preferred embodiment of the present invention after the polymer has been temporarily stabilized with trichloroacetic acid or trifluoroacetic acid, it is then contacted with a solvent that is immiscible with the polymeric acetal carboxylate to remove undesirable materials such as unreacted monomer and short polymer chains, excess trichloroacetic acid or trifluoroacetic acid, other solvents and the like. Some of these materials can react with the alkyl vinyl ether endcapping agent and would unnecessarily increase the amount of alkyl vinyl ether required to obtain high yields of polymer product stabilized against rapid depolymerization in alkaline solution.

The immiscible solvent can be any number of materials known to those skilled in the art. It is only necessary that the solvent (1) does not react with the polymer, (2) is effective in removing the impurities from the polymer, and (3) is immiscible with the polymer, i.e., the polymer is essentially insoluble in the solvent. Suitable solvents include aromatic compounds containing up to about 12 carbon atoms such as benzene, toluene, xylene, ethyl benzene, isopropyl benzene, diethyl benzene and the like and mixtures of such aromatic compounds with aliphatic compounds. Suitable aliphatic compounds include compounds containing from about 4 to about 20 carbon atoms, which can be saturated or unsaturated, such as butane, hexane, cyclohexane, petroleum ether, octane, pentene, heptene, nonene and the like. Satisfactory results can also be obtained with ethers containing 3 to about 20 carbon atoms, such as diethyl ether, methylethyl ether and the like and mixtures with aliphatic compounds. It is preferred that the solvent is a mixture of an aromatic compound and an aliphatic compound, particularly when the aromatic compound and aliphatic compound are in a weight ratio of about 1:1, say between about 1:3 and about 3:1. A solvent mixture of toluene and hexane in this concentration range provides unusually good results, although other mixtures of solvents such as hexane and diethyl ether, or petroleum ether and diethyl ether, also provide satisfactory results.

The ratio of immiscible solvent to polymeric ester can vary within wide ranges. As little as 1 milliliter of solvent per 5 grams of polymeric ester can be used, or even less although most of the impurities may not be removed when using such a small amount of solvent. On the other hand, there is no upper limit to the amount of solvent that can be used, although the use of more than about 5 milliliters of solvent per gram of polymer does not seem to be advantageous. It is preferred to use from about 1 milliliter to about 3 milliliters of solvent per gram of polymer acetal carboxylate.

If the polymeric acetal carboxylate is contacted with an immiscible solvent, and separated from the solvent by techniques known to those skilled in the art, for example by decantation, centrifugation and the like to obtain a polymer of greater purity, some trichloroacetic acid or trifluoroacetic acid is removed. Thus, is is necessary to add to the purified polymer a miscible solvent and a sufficient additional amount of trichloroacetic acid or trifluoroacetic acid to act as an endcapping catalyst. On the other hand, if the polymeric acetal carboxylate has not been contacted with an immiscible solvent but nevertheless does not contain a sufficient amount of miscible solvent and trichloroacetic acid or trifluoroacetic acid to promote efficient stabilization with alkyl vinyl ether, sufficient additional amounts of miscible solvent and trichloroacetic acid or trifluoroacetic acid should be added to the polymer before the alkyl vinyl ether is added.

Any number of solvents known to those skilled in the art are miscible with the purified polymeric acetal carboxylate and can be used in the process of the present invention. Suitable solvents include diemthyl sulfoxide, acetone, methylene chloride, tetrahydrofuran, ethyl acetate and the like. It is preferred to use a solvent that has a dielectric constant of at least about 15. It was surprisingly found that while other useful solvents for the endcapping reaction, such as methylene chloride and the like, give comparable results when the level of alkyl vinyl ether is relatively high, e.g., 0.3 mole of alkyl vinyl ether per mole of aldehyde ester monomer charged to the reaction zone, the solvents used in the preferred process of the present invention permit the use of much less alkyl vinyl ether. Such preferred solvents include dimethyl sulfoxide, acetone and the like. It is especially preferred to use alkyl nitriles having 1 to about 4 carbon atoms in the alkyl group, or more, although there does not seem to be a particular advantage in using alkyl nitriles of higher molecular weight. Acetonitrile is particularly preferred.

The amount of solvent for use in the process of the present invention can vary within wide limits. It is preferred to use from about one-tenth to about one volume of solvent for each volume of polymerized acetal carboxylate. When lesser amounts of solvent are used, efficient agitation is difficult to achieve. On the other hand, when greater amounts of solvent are used, the reaction volume in the subsequent endcapping step can become too large, and such large amounts of solvent are unnecessary.

The additional amount of trichloroacetic acid or trifluoroacetic acid to be provided to the polymer to act as an endcapping catalyst can vary from about 0.01 mole to about 0.04 mole per mole of aldehyde ester used to produce the polymer. No particular benefit can be seen for using more than 0.04 mole of trifluoroacetic acid or trichloroacetic acid, although the presence of higher levels is not harmful. However, the use of levels lower than 0.01 mole per mole reduces the yield of polymer that is stable against rapid depolymerization in alkaline solution. It is preferred to use between about 0.015 and 0.020 mole of trifluoroacetic acid or trichloroacetic acid per mole of aldehyde ester used to produce the polymer product. Trifluoroacetic acid is preferred.

The rate of addition and the sequence of addition of the alkyl vinyl ether and the additional endcapping catalyst can affect the chain length and/or yield of the resulting polymer product. When the alkyl vinyl ether is added in portions over an extended period of time, the yield of polymer product is low and the resulting polymer product has poor sequestration values. Hence, it is preferred to add the alkyl vinyl ether over a short period of time. Further, adding the alkyl vinyl ether before the additional endcapping catalyst is added to the temporarily stabilized and purified polymeric acetal carboxylate ester causes a reduction in the chain length of the resulting material. Hence, in the preferred process the additional endcapping catalyst, preferably trifluoroacetic acid, is added to the polymeric acetal carboxylate ester followed by the addition of the alkyl vinyl ether, preferably ethyl vinyl ether.

Suitable alkyl vinyl ethers include methyl vinyl ether, ethyl vinyl ether, propyl vinyl ether, isopropyl vinyl ether, isobutyl vinyl ether and the like. Even vinyl ethers having up to 20 carbon atoms in the alkyl chain, such as octadecyl vinyl ether, can be used although it is preferred to use alkyl vinyl ethers having up to about 6 carbon atoms, such as the methyl, ethyl or propyl vinyl ethers. Ethyl vinyl ether is especially preferred.

The preferred temperature for adding the stable end group derived from the alkyl vinyl ether to the polymer product to provide stability against rapid depolymerization in alkaline solution is at least 5° C. higher than the temperature at which the trichloroacetic acid or trifluoroacetic acid is added to the resulting polymer, for example, between about 20° C. to about 25° C. At these temperatures, the stabilization can be completed in about 1-3 hours with relatively few side reactions. Temperatures above about 25° C. tend to produce a polymer product of poorer quality whereas lower temperatures slow the reaction rate.

The polymer which is now stabilized against rapid depolymerization in alkaline solution, is useful as an intermediate to prepare the corresponding alkali metal, ammonium or alkanol amine salts. It is only necessary to saponify the stabilized polymeric ester with a base, such as lithium hydroxide, sodium hydroxide, potassium hydroxide and the like, using conventional saponification techniques to make a polymeric salt for use in a builder and as a sequestrant. The ammonium or alkanol amine salts can be prepared from the corresponding alkali metal salts using conventional ion exchange techniques.

The amount of polymer salt required to effectively complex the ions in a given system will depend to some extent on the particular polymer salt being used and the particular metal ion in the aqueous medium. Because the polymer tends to depolymerize in acid media, effective complexing is limited to neutral or preferably basic solution. Optimum conditions and amounts of the polymer salt to be used can readily be determined by routine experimentation.

The polymer salts are also useful as builders in detergent formulations. Since the pH of the detergent solution is usually between pH 9 and pH 11, the polymer salts will not depolymerize rapidly when used as a detergent builder in aqueous solution at normal use concentrations (about 1200-1500 ppm formulation in the wash water), temperatures (10°-60° C.) and times (i.e., about 15 minutes) typical of U.S. home laundry practices. Generally the use of the alkali metal salts, particularly the sodium salt, is preferred. However, in some formulations where greater builder solubility is required, the use of ammonium or alkanol amine salts may be desirable.

The detergent formulations will contain at least 1 percent by weight and preferably at least 5 percent by weight of the polymer salts. In order to obtain the maximum advantages of the polymer salts as builders, the detergent should preferably contain from about 5 percent to about 75 percent of these salts. The polymer salts can be the sole detergency builder, or the polymer salts can be utilized in combination with other detergency builders which may constitute from 0 to 95 percent by weight of the total builders in the formulation. The amount and choice of builder, surfactant and other detergent ingredients, such as optical brighteners, fillers, bleaches, dyes, soil antiredeposition agents, perfumes and the like, will be in accordance with well understood practices of detergent formulation.

DESCRIPTION OF THE PREFERRED EMBODIMENTS

This invention is illustrated by, but not limited to, the following Examples wherein all percentages are by weight unless otherwise noted.

EXAMPLE I

This Example illustrates the preparation of the anhydrous ester aldehyde useful to prepare the polymers of the present invention.

A 2-liter, 4-necked, round bottom flask equipped with an overhead stirrer, thermometer and 30 centimeter Vigreaux column and take-off head, is charged with 1200 grams (10 moles) of methyl glyoxylate methyl hemiacetal. A total of 568 grams of phosphorus pentoxide (4 moles) is added in 4-6 portions, keeping the reaction temperature below 90° C. The addition requires about 90 minutes. When the addition is complete, the mixture is stirred until the temperature has fallen to about 70° C. (0.5 hour). The mixture is distilled at aspirator vacuum (20-40 torr) yielding 764 grams crude methyl glyoxylate having a boiling point of 56°-61° C.; the distillation is stopped when the pot temperature reaches 125° C. Chromatographic analysis of this crude material indicates 86.6 percent glyoxylate, 9.3 percent methyl dimethoxyacetate, 3.3 percent dimethyl oxalate and trace amount of unidentified products.

The crude product is then distilled from 25 grams of 3A molecular sieves (which had been heated to about 250° C. to drive off residual moisture and organics) through the Vigreaux column. A 15-gram forecut of about 97 percent pure glyoxylate is collected initially. The Vigreaux column is replaced by a 30 centimeter Widmer column and 521 grams of 99 percent pure polymerizable grade methyl glyoxylate is collected having a boiling point of 83°-84° C. at 210 torr. A final cut of 36 grams (93 percent pure) ester is collected in a final fraction (91°-94° C.; 210 torr). The overall yield of polymerizable glyoxylate is 59 percent from the hemiacetal.

The polymerizable glyoxylate is stored in a glass-stoppered bottle at −70° C. until ready for use.

EXAMPLE II

This Example illustrates the preferred process of the present invention.

To a 100 milliliter, 3-necked, round bottom flask equipped with an efficient stirrer and a thermometer is added 5.3 milliliters of acetonitrile and 24.7 grams (0.281 mole) of aldehyde ester from Example I. The temperature of the mixture is lowered to −10° C. using a methanol-ice bath, and 0.07 milliliter of 0.05 molar sodiodiethyl methylmalonate in acetonitrile is added. Polymerization is rapid and exothermic and the temperature rises to about 20° C. Stirring and cooling are continued. About 30 minutes later with the temperature again at −10° C., 0.307 milliliter (0.0042 mole) of trifluoroacetic acid is added and stirring is continued for another 45 minutes. The solution is allowed to warm to room temperature and is then extracted for 2 to 3 minutes for three times with 25 milliliter portions of 2:1 toluene/petroleum ether mixture. The upper hydrocarbon extract is decanted from the polymerized aldehyde ester. Then, 13.5 milliliters of acetonitrile and 0.26 milliliter of trifluoroacetic acid are added to the resultant gum. After about 10 minutes, 2 milliliters (0.021 mole equal to 0.075 mole per mole of monomer charged) of ethyl vinyl ether is added and the solution stirred for 90 minutes at room temperature. The solution is washed four times with 20 milliliter portions of 3:1 diethyl ether/petroleum ether for 10 minutes each wash, followed by one 15 minute wash with 40 milliliters of 0.5 molar NaOH which is also decanted. Then, 45 milliliters of 7 molar NaOH is added dropwise to the stabilized methyl ester polymer over a period of about 15 minutes while controlling the temperature to less than 45° C. The slurry is stirred, cooled to room temperature and about 30 milliliters of methanol are added and the slurry is stirred for an additional 0.5 hour. The precipitate is separated by filtration and dried in a vacuum oven at 35° C. for 12 hours.

Twenty-one grams of material were obtained for a yield of 71 percent, based on the amont of aldehyde ester. Analysis by Proton Nuclear Magnetic Resonance indicates that the chain length averages about 200 units. A sample of the polymer is tested for sequestration function using the procedure described by Matzner et al "Organic Builder Salts As Replacements For Sodium Tripolyphosphate", TENSIDE, 10, No. 3, pages 119-125 (1973). The sequestration of calcium ions and magnesium ions as a percent of STPP performance shows that the polymer salt is about 128 percent of STPP.

EXAMPLE III

This Example illustrates the reduced usage of ethyl vinyl ether according to the process of the present invention.

In Runs 1-3, the general procedure of Example II was repeated except that the number of equivalents of ethyl vinyl ether (EVE) for the endcapping reaction was varied, methylene chloride instead of acetonitrile was used as the solvent, and the steps between the first addition of trifluoroacetic acid and the addition of ethyl vinyl ether were omitted. The results are shown in Table 1 below along with the results from Example II (listed as Run 4) for comparison.

TABLE 1

| Run No. | Equivalents Of EVE | Endcap Solvent | Yield (%) | $\overline{DP_n} \pm 3$ Units | % STP |
|---|---|---|---|---|---|
| 1 | 0.3 | CH$_2$Cl$_2$ | 73 | 76 | 135 |
| 2 | 0.2 | CH$_2$Cl$_2$ | 73 | 86 | 91 |
| 3 | 0.2 | CH$_2$Cl$_2$ | 71 | 125 | 89 |
| 4 | 0.075 | CH$_3$CN | 71 | 200 | 128 |

Thus, it can be seen that when the preferred acetonitrile and intermediate washing procedure according to the improved process of the present invention are not used, a significantly larger amount of ethyl vinyl ether is required to obtain a favorable sequestration value greater than 100 percent of STPP.

EXAMPLE IV

This Example illustrates the improved results that are achieved using solvents with high dielectric constants, especially acetonitrile, the preferred solvent.

The general procedure of Example II is repeated except that different solvents are used for the endcapping reaction, the amount of ethyl vinyl ether used is 0.2 mole per mole of aldehyde ester monomer charged, and the intermediate stabilization with trifluoroacetic acid followed by extracting the polymer with toluene/petroleum ether is omitted. The results are presented in Table 2 below, and they clearly show that solvents with high dielectric constants provide superior products.

TABLE 2

| Solvent | Dielectric Constant | $DP_n \pm 3$ Units | Yield (%) | % STP |
|---|---|---|---|---|
| Acetonitrile | 38.0 | 99 | 88 | 148 |
| Acetone | 20.7 | 58 | 94 | 128 |
| Methylene Chloride | 9.1 | 112 | 73 | 84 |
| Tetrahydrofuran | 7.9 | 75 | 54 | 62 |
| Ethyl Acetate | 6.0 | 58 | 70 | 71 |

EXAMPLE V

This Example illustrates the improved results that are achieved by temporarily stabilizing the polymer using trifluoroacetic acid at 0° C. or lower and washing with an immiscible solvent.

The general procedure of Example II is repeated except that the steps of providing temporary stability to the polymer and the intermediate washing procedure are omitted, and the amount of ethyl vinyl ether to stabilize the polymer is varied. The smallest amount of ethyl vinyl ether producing a satisfactory product is 0.10 mole per mole of monomer charged, which is 33 percent greater than the 0.075 mole used in Example II.

EXAMPLE VI

This Example illustrates the improved results that are achieved by temporarily stabilizing the polymer using trifluoroacetic acid at a low temperature, and adding ethyl vinyl ether at a higher temperature.

The general procedure of Example II is repeated except that 0.2 mole of ethyl vinyl ether is used per mole of aldehyde ester, the temporarily stabilized polymer is not extracted with toluene/petroleum ether, and the temperature at which the trifluoroacetic acid is added to temporarily stabilize the polymer is varied. In one run the trifluoroacetic acid is added at −10° C., and the resulting polymer has a calcium and magnesium ion sequestration performance of 148 percent of STPP. In a second run, the trifluoroacetic acid is added at 25° C., and the resulting polymer has a calcium and magnesium ion sequestration performance substantially lower than 148 percent of STPP.

Although the invention has been described in terms of specified embodiments which are set forth in considerable detail, it should be understood that this is by way of illustration only and that the invention is not necessarily limited thereto since alternative embodiments and operating techniques will become apparent to those skilled in the art in view of the disclosure. Accordingly, modifications are contemplated which can be made without departing from the spirit of the described invention.

What is claimed is:

1. A process which comprises:
   (A) bringing together an ester of glyoxylic acid and a polymerization initiator under polymerization conditions;
   (B) adding to the resulting polymer a sufficient amount of trichloroacetic acid or trifluoroacetic acid to provide a temporarily stabilized polymer;
   (C) providing a miscible solvent and a sufficient amount of trichloroacetic acid or trifluoroacetic acid to act as an endcapping catalyst for the temporarily stabilized polymer; and
   (D) adding an alkyl vinyl ether having up to about 20 carbon atoms in the alkyl group to provide a chemically stable end group at the polymer termini to stabilize the polymer against rapid depolymerization in alkaline solution.

2. A process of claim 1 wherein the alkyl vinyl ether is added to the temporarily stabilized polymer at a temperature at least about 5° C. higher than the temperature at which the trichloroacetic acid or trifluoroacetic acid is added to the resulting polymer.

3. A process of claim 1 wherein the trichloroacetic acid or the trifluoroacetic acid is added to the resulting polymer at a temperature below about 10° C.

4. A process of claim 1, 2 or 3 wherein trifluoroacetic acid is added.

5. A process of claim 1 wherein the temporarily stabilized polymer is contacted with an immiscible solvent.

6. A process of claim 1 wherein the temporarily stabilized polymer is contacted with an immiscible solvent selected from the group consisting of aromatic compounds containing up to about 12 carbon atoms, ethers containing 3 to about 20 carbon atoms, and mixtures of aromatic compounds or ethers and aliphatic compounds containing from about 4 to about 20 carbon atoms.

7. A process of claim 5 or 6 wherein trifluoroacetic acid is used.

8. A process of claim 1 or 6 wherein the miscible solvent has a dielectric constant of at least about 15.

9. A process of claim 1 or 6 wherein the miscible solvent is acetonitrile.

10. A process of claim 1, 2, 3 or 6 wherein the alkyl vinyl ether is ethyl vinyl ether.

11. A process of claim 2 wherein trifluoroacetic acid is added, the temporarily stabilized polymer is contacted with an immiscible solvent, and the alkyl vinyl ether is ethyl vinyl ether.

12. A process of claim 11 wherein the miscible solvent has a dielectric constant of at least about 15.

13. A process of claim 11 wherein the miscible solvent is acetonitrile.

14. A process of claim 11 wherein the amount of ethyl vinyl ether is less than 0.2 mole per mole of ester of glyoxylic acid.

15. A process of claim 12 wherein the amount of miscible solvent is between about 0.1 and about 1 volume of solvent per volume of temporarily stabilized polymer.

16. A process of claim 13 wherein the polymer which is stabilized against rapid depolymerization in alkaline solution is saponified with an alkali metal hydroxide.

17. A process of claim 16 wherein the alkali metal hydroxide is sodium hydroxide.

18. A process of claim 11 or 16 wherein the ester of glyoxylic acid is methyl glyoxylate.

* * * * *